United States Patent
Yin et al.

(10) Patent No.: US 8,537,894 B2
(45) Date of Patent: Sep. 17, 2013

(54) METHODS AND APPARATUS FOR INTER-LAYER RESIDUE PREDICTION FOR SCALABLE VIDEO

(75) Inventors: Peng Yin, West Windsor, NJ (US); Jiancong Luo, West Windsor, NJ (US); Yong Ying Gao, Chaoyang District (CN); Yu Wen Wu, Beijing (CN)

(73) Assignee: Thomson Licensing, Boulogne-Billacourt (FR)

( * ) Notice: Subject to any disclaimer, the term of this patent is extended or adjusted under 35 U.S.C. 154(b) by 459 days.

(21) Appl. No.: 12/734,173

(22) PCT Filed: Oct. 14, 2008

(86) PCT No.: PCT/US2008/011710
§ 371 (c)(1),
(2), (4) Date: Apr. 15, 2010

(87) PCT Pub. No.: WO2009/051692
PCT Pub. Date: Apr. 23, 2009

(65) Prior Publication Data
US 2010/0208809 A1     Aug. 19, 2010

Related U.S. Application Data

(60) Provisional application No. 60/979,956, filed on Oct. 15, 2007.

(51) Int. Cl.
*H04N 7/12* (2006.01)
*H04N 7/50* (2006.01)
(52) U.S. Cl.
USPC ............. 375/240.12; 375/240.01; 375/240.13

(58) Field of Classification Search
None
See application file for complete search history.

(56) References Cited

U.S. PATENT DOCUMENTS

| | | | |
|---|---|---|---|
| 7,483,486 B2* | 1/2009 | Mantiuk et al. | 375/240.03 |
| 7,876,833 B2* | 1/2011 | Segall et al. | 375/240.24 |
| 8,014,445 B2* | 9/2011 | Segall et al. | 375/240.01 |
| 2005/0259729 A1* | 11/2005 | Sun | 375/240.1 |

(Continued)

FOREIGN PATENT DOCUMENTS

| | | | |
|---|---|---|---|
| EP | 1827024 A1 | 8/2007 | |
| WO | WO 2004/045217 | * | 5/2004 |
| WO | WO 2005/104035 | * | 11/2005 |

OTHER PUBLICATIONS

Winken et al, "Bit-Depth Scalable Video Coding", Proceedings of the IEEE International Conference on Image Processing (ICIP 2007), ISBN: 1-4244-1437, vol. I, pp. I-5 to I-8.*

(Continued)

*Primary Examiner* — Gims Philippe
*Assistant Examiner* — Reza Agevli
(74) *Attorney, Agent, or Firm* — Robert D. Shedd; Paul P. Keil; Xiaoan Lu (57) ABSTRACT

There are provided methods and apparatus for inter-layer residue prediction for scalable video. An apparatus is described for an encoder for encoding a block of a picture, or a decoder for decoding a block of a picture, by applying inverse tone mapping to an inter-layer residue prediction process for the block, wherein the inverse tone mapping is performed in the pixel domain. Methods for encoding or decoding a block of a picture are also described; and performed by applying inverse tone mapping to an inter-layer residue prediction process for the block, wherein the inverse tone mapping is performed in the pixel domain.

12 Claims, 5 Drawing Sheets

(56) References Cited

U.S. PATENT DOCUMENTS

| | | | |
|---|---|---|---|
| 2006/0268991 | A1 | 11/2006 | Segall et al. |
| 2007/0014362 | A1* | 1/2007 | Cruz et al. ............... 375/240.16 |
| 2007/0201560 | A1 | 8/2007 | Segall et al. |

OTHER PUBLICATIONS

Haskell et al, "Digital Video: An INtroduction to MPEG-2", Chapman & Hall, 1997, ISBN: 0-412-08411-2, pp. 230-232, 244 & 247-248.*

Sullivan, et al, "Video Compression—From Concepts to the H.264/AVC Standard", Proceedings of the IEEE, vol. 93, No. 1, Jan. 2005, pp. 18-31.*

Schwartz, "Overview of the Scalable Video Coding EXtension of the H.264/AVC Standard", IEEE Transactions on Circuits and Systems for Video Technology, vol. 17, No. 9, Sep. 2007, pp. 1103-1120.*

Segall. "Scalable Coding of High Dynamic Range Video", Proceedings of the IEEE International Conference on Image Processing (ICIP 2007), ISBN: 1-4244-1437, vol. I, pp. I-1 to I-4.*

Gao et al.: "Applications and Requirement for Color Bit Depth Scalability," Thomson, Joint Video Team (JVT) of ISO/IEC MPEG & ITU-T VCEG, Doc. JVT-U049, Oct. 20, 2006, pp. 1-10.

ITUT: "Advanced Video Coding for Generic Audiovisual Services," Series H: Audiovisual and Multimedia Systems, ITU-T Recommendation H.264, Mar. 2005, pp. 1-343.

Schwarz et al.: "Constrained Inter-Layer Prediction for Single-Loop Decoding in Spatial Scalability," IEEE, 2005, 4 pages.

Segall et al.: "CE2: Inter-Layer Prediction for Bit-Depth Scalable Coding," Sharp Labs of America, Joint Video Team (JVT) of ISO/IEC MPEG & ITU-T VCEG, Doc, JVT-X067, Jun. 29, 2007, pp. 1-227.

Segall et al.: "System for Bit-Depth Scalable Coding," Sharp Labs of America, Joint Video Team (JVT) of ISO/IEC MPEG & ITU-T VCEG, Doc. JVT-W113, Apr. 21, 2007, pp. 1-7.

Segall et al.: "Tone Mapping SEI Message," Sharp Labs of America, Joint Video Team (JVT) of ISO/IEC MPEG & ITU-T VCEG, Doc. JVT-T060, Jul. 17, 2006, pp. 1-13.

Vetro et al.: "Joint Draft 4.0 on Multiview Video Coding," Joint Video Team (JVT) of ISO/IEC MPEG & ITU-T VCEG, Doc. JVT-X209, Jun. 29, 2007, pp. 1-34.

Winken et al.: "CE2: SVC Bit-Depth Scalable Coding," Fraunhofer HHI, Joint Video Team (JVT) of ISO/IEC MPEG & ITU-T VCEG, Doc. JVT-X057, Jun. 29, 2007, pp. 1-15.

Winken et al.: "Bit-Depth Scalable Video Coding," IEEE, 2007, pp. I-5-I-8.

Wu et al.: "Study on Inter-Layer Prediction in Bit-Depth Scalability," Thomson Inc., Joint Video Team (JVT) of ISO/IEC MPEG & ITU-T VCEG, Doc. JVT-X052, Jun. 29, 2007, pp. 1-13.

The International Search Report, dated Apr. 17, 2009.

Gao, Y. et al., "Report of AhG on Bit-Depth and Chroma Format Scalability", Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Jan. 13-19, 2007; Document: JVT-V010.

Wu, Y. et al., "Bit Depth Scalable Coding", International Conference on Multimedia and Expo, Jul. 2-5, 2007, IEEE.

* cited by examiner

METHODS AND APPARATUS FOR INTER-LAYER RESIDUE PREDICTION FOR SCALABLE VIDEO

CROSS-REFERENCE TO RELATED APPLICATIONS

This application claims the benefit, under 35 U.S.C. §365 of International Application PCT/US2008/011710, filed Oct. 14, 2008, which was published in accordance with PCT Article 21 (2) on Apr. 23, 2009 in English and which claims the benefit of U.S. provisional patent application No. 60/979,956, filed Oct. 15, 2007, which are incorporated by reference in their respective entireties. Further, this application is related to the non-provisional application, Ser. No. 12/734,175, entitled "METHODS AND APPARATUS FOR INTER-LAYER RESIDUE PREDICTION FOR SCALABLE VIDEO", which also claims the benefit of U.S. provisional patent application No. 60/979,956, filed Oct. 15, 2007.

TECHNICAL FIELD

The present principles relate generally to video encoding and decoding and, more particularly, to methods and apparatus for inter-layer residue prediction for scalable video.

BACKGROUND

"Bit depth", which is also interchangeably known as "color depth" and/or "pixel depth", refers to the number of bits used to hold a pixel. The bit depth determines the maximum number of colors that can be displayed at one time. In recent years, digital images and/or digital videos with a bit depth greater than eight are more desirable in many application fields including, but not limited to, medical image processing, digital cinema workflows in production and postproduction, home theatre related applications, and so forth.

There are several ways to handle the coexistence of, for example, an 8-bit video and a 10-bit video. In a first prior art solution, only a 10-bit coded bit-stream is transmitted and the 8-bit representation for standard 8-bit display devices is obtained by applying tone mapping methods to the 10-bit presentation. Tone mapping is a well-known technique to convert a higher bit depth to a lower bit depth, often to approximate the appearance of high dynamic range images in media with a more limited dynamic range.

In a second prior art solution, a simulcast bit-stream that includes an 8-bit coded presentation and 10-bit coded presentation is transmitted. It is the preference of the decoder in choosing which bit-depth to decode. For example, a 10-bit capable decoder can decode and output a 10-bit video while a normal decoder supporting only 8-bit video can just output an 8-bit video.

The first solution is inherently non-compliant with 8-bit profiles of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). The second solution is compliant to all the current standards but requires more overhead. However, a good tradeoff between bit reduction and backward standard compatibility can be a scalable solution. Scalable video coding (SVC), also known as a scalable extension of the MPEG-4 AVC Standard, considers the support of bit-depth scalability.

There are at least three advantages of bit-depth scalable coding over post-processing or simulcast. A first advantage is that bit-depth scalable coding enables 10-bit video in a backward-compatible manner with the High Profiles of the MEG-4 AVC Standard. A second advantage is that bit-depth scalable coding enables adaptation to different network bandwidths or device capabilities. A third advantage of the bit-depth scalable coding is that is provides low complexity, high efficiency and high flexibility.

In the current scalable video coding extension of the MPEG-4 AVC Standard, single-loop decoding is supported to reduce the decoding complexity. The complete decoding, including motion-compensated prediction and the deblocking, of the inter-coded macroblocks is only required for the current spatial or coarse grain scalable (CGS) layer. This is realized by constraining the inter-layer intra texture prediction to those parts of the lower layer picture that are coded with intra macroblocks. To extend inter-layer intra texture prediction for bit depth scalability, inverse tone mapping is used. Scalable video coding also supports inter-layer residue prediction. Since in general, tone mapping is used in pixel (spatial) domain, it is very difficult to find the corresponding inverse tone mapping in the residue domain. In third and fourth prior art approaches, bit shift is used for inter-layer residue prediction.

In a fifth prior art approach referred to as smooth reference prediction (SRP), which is a technique to increase interlayer coding efficiency for single loop decoding without bit depth scalability, a one-bit syntax element smoothed_reference_flag is sent when the syntax elements residual_prediction_flag and base_mode_flag are both set. When smoothed_reference_flag is equal to one, the following steps are taken at the decoder to obtain the reconstructed video block:

1. The prediction block P is obtained using the enhancement layer reference frames and the upsampled motion vectors from base layer;
2. The corresponding base layer residual block $r_b$ is upsampled and $U(r_b)$ is added to P to form $P+U(r_b)$;
3. A smoothing filter with tap [1,2,1] is applied, first in the horizontal direction and then in the vertical direction, to obtain $S(P+U(r_b))$; and
4. The enhancement layer residual block is added to (3) to obtain the reconstruction block $R=S(P+U(r_b))+r_e$.

Figure 1:
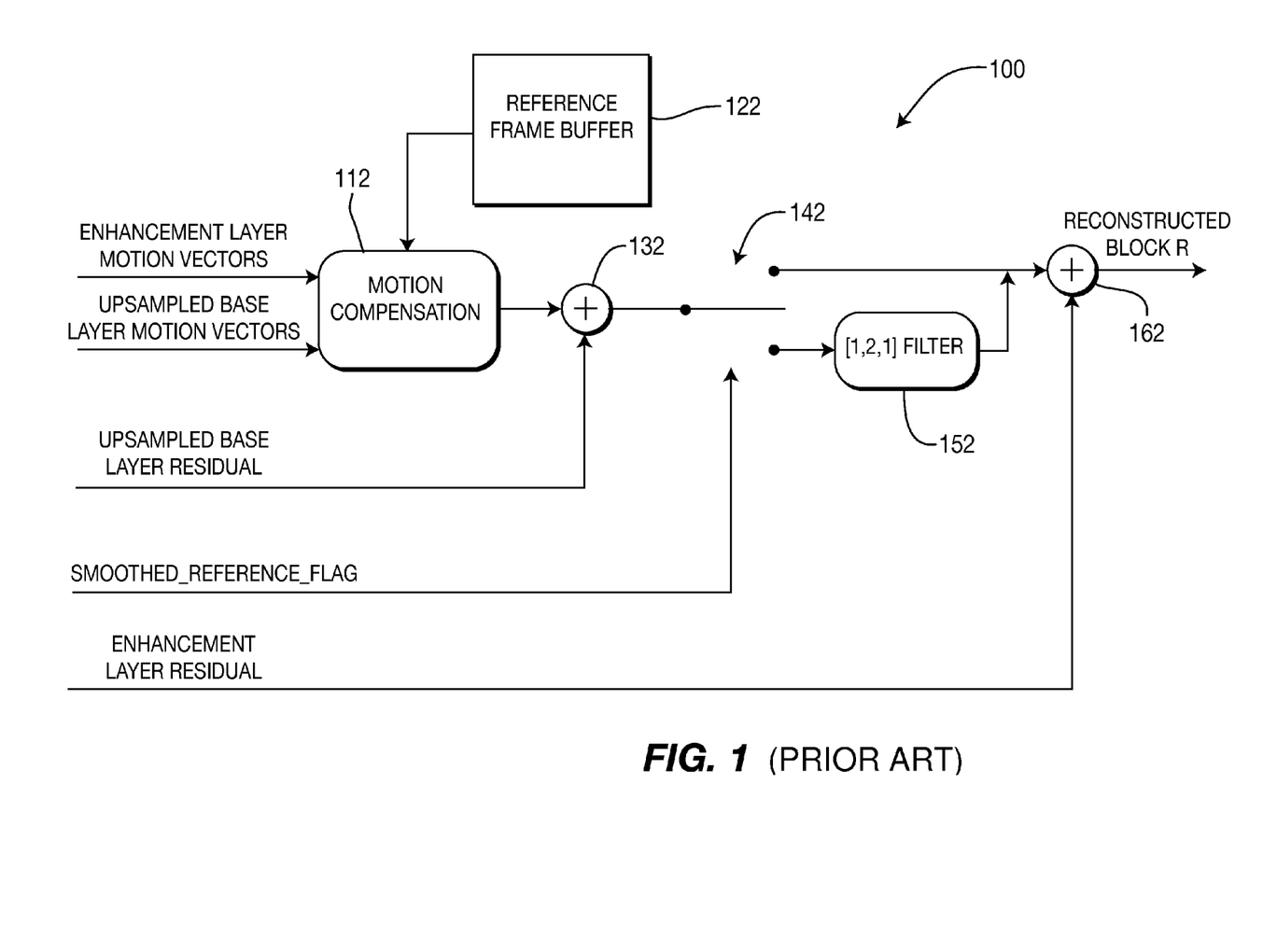
FIG. 1 is a block diagram for a portion of a decoder using smooth reference prediction, in accordance with the prior art.

Turning to FIG. 1, a portion of a decoder using smooth reference prediction is indicated generally by the reference numeral 100.

The decoder portion 100 includes a motion compensator 112 having an output in signal communication with a first non-inverting input of a combiner 132. An output of the combiner 132 is connected in signal communication with an input of a switch 142. A first output of the switch 142 is connected in signal communication with a first non-inverting input of a combiner 162. A second output of the switch 142 is connected in signal communication with an input of a filter 152. An output of the filter 152 is connected in signal communication with the first non-inverting input of the combiner 162.

An output of a reference frame buffer 122 is connected in signal communication with a first input of the motion compensator 112.

A second input of the motion compensator 112 is available as an input to the decoder portion 100, for receiving enhancement layer motion vectors. A third input of the motion compensator 112 is available as an input to the decoder portion 100, for receiving upsampled base layer motion vectors. A second non-inverting input of the combiner 132 is available as an input of the decoder portion 100, for receiving an upsampled base layer residual. A control input of the switch 142 is available as an input of the decoder portion 100, for receiving a smoothed_reference_flag syntax element. A second non-inverting input of the combiner 162 is available as an input of the decoder portion 100, for receiving an enhancement layer residual. An output of the combiner 162 is available as an output of the decoder portion 100, for outputting a reconstructed block R.

However, the preceding prior art techniques disadvantageously cannot be directly used with bit depth scalability.

SUMMARY

These and other drawbacks and disadvantages of the prior art are addressed by the present principles, which are directed to methods and apparatus for inter-layer residue prediction for scalable video.

According to an aspect of the present principles, there is provided an apparatus. The apparatus includes an encoder for encoding a block of a picture by applying inverse tone mapping to an inter-layer residue prediction process for the block. The inverse tone mapping is performed in the pixel domain to support bit depth scalability.

According to another aspect of the present principles, there is provided a method. The method includes encoding a block of a picture by applying inverse tone mapping to an inter-layer residue prediction process for the block. The inverse tone mapping is performed in the pixel domain to support bit depth scalability.

According to yet another aspect of the present principles, there is provided an apparatus. The apparatus includes a decoder for decoding a block of a picture by applying inverse tone mapping to an inter-layer residue prediction process for the block. The inverse tone mapping is performed in the pixel domain to support bit depth scalability.

According to a still further aspect of the present principles, there is provided a method. The method includes decoding a block of a picture by applying inverse tone mapping to an inter-layer residue prediction process for the block. The inverse tone mapping is performed in the pixel domain to support bit depth scalability.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for inter-layer residue prediction for scalable video.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment. Moreover, the phrase "in another embodiment" does not exclude the subject matter of the described embodiment from being combined, in whole or in part, with another embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the scalable video coding extension of the MPEG-4 AVC standard, the present principles are not limited to solely this extension and/or this standard and, thus, may be utilized with respect to other video coding standards, recommendations, and extensions thereof, while maintaining the spirit of the present principles.

Further, it is to be appreciated that while the following description herein uses 10-bit video with respect to one or more examples of high bit video, the present principles are applicable to any number of bits greater than eight including, but not limited to, for example, 12-bit, 14-bit, and so forth.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

As noted above, the present principles are directed to methods and apparatus for inter-layer residue prediction for scalable video.

Figure 2:
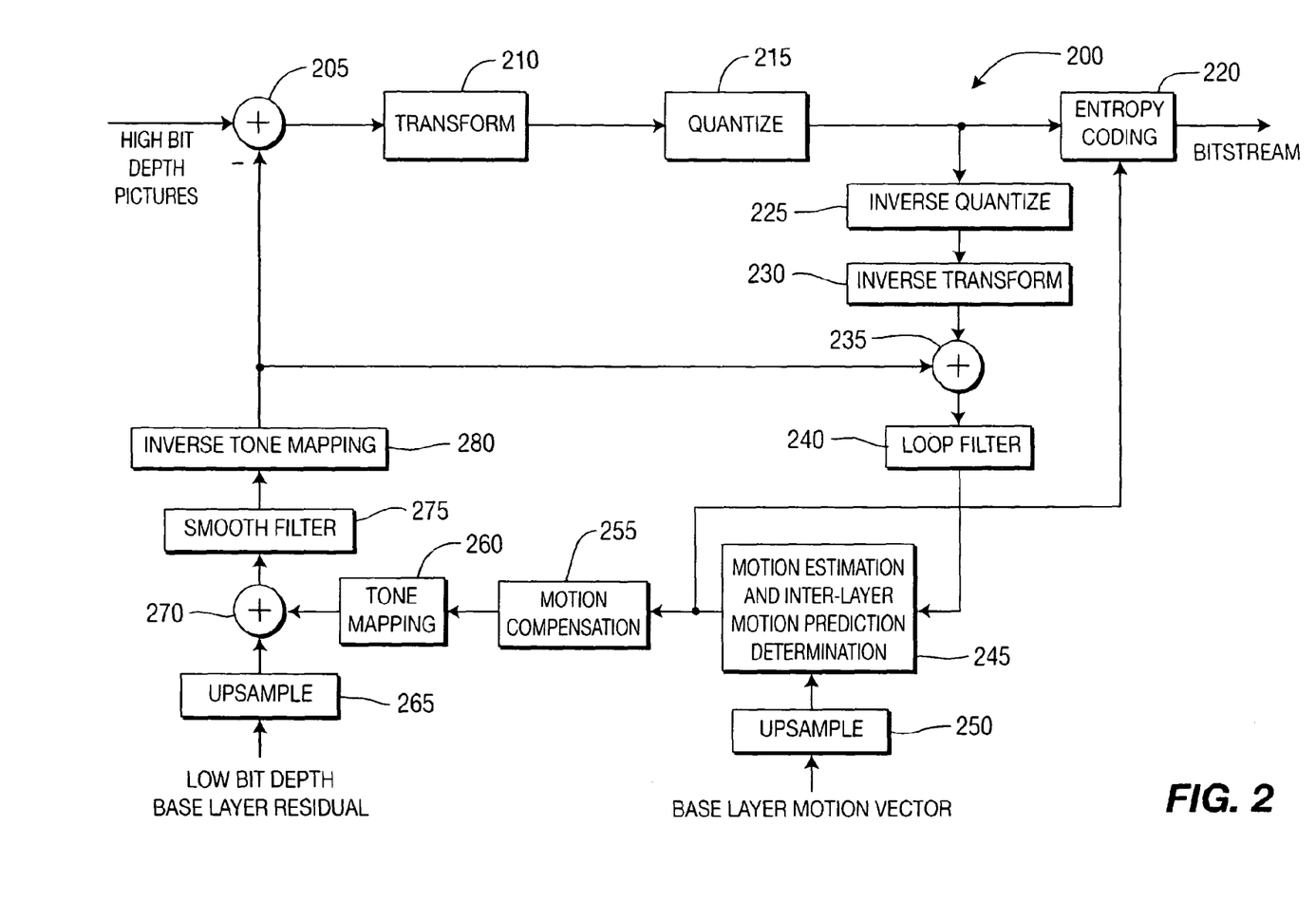
FIG. 2 is a block diagram for an exemplary video encoder to which the present principles may be applied, in accordance with an embodiment of the present principles.

Turning to FIG. 2, an exemplary video encoder to which the present principles may be applied is indicated generally by the reference numeral 200.

The encoder 200 includes a combiner 205 having an output in signal communication with an input of a transformer 210. An output of the transformer 210 is connected in signal communication with an input of a quantizer 215. An output of the quantizer is connected in signal communication a first input of an entropy coder 220 and an input of an inverse quantizer 225. An output of the inverse quantizer 225 is connected in signal communication with an input of an inverse transformer 230. An output of the inverse transformer 230 is connected in signal communication with a first non-inverting input of a combiner 235. An output of the combiner 235 is connected in signal communication with an input of a loop filter 240. An output of the loop filter 240 is connected in signal communication with a first input of a motion estimator and inter-layer prediction determinator 245. An output of the motion estimator and inter-layer prediction determinator 245 is connected in signal communication with a second input of the entropy coder 220 and an input of a motion compensator 255. An output of the motion compensator 255 is connected in signal communication with an input of a tone mapper 260. An output of the tone mapper 260 is connected in signal communication with a first non-inverting input of a combiner 270. An output of the combiner 270 is connected in signal communication with an input of a smooth filter 275. An output of the smooth filter 275 is connected in signal communication with an input of an inverse tone mapper 280. An output of the inverse tone mapper 280 is connected in signal communication with a second non-inverting input of the combiner 235 and an inverting input of the combiner 105. An output of an upsampler 250 is connected in signal communication with a second input of the motion estimator and inter-layer prediction determinator 245. An output of an upsampler 265 is connected in signal communication with a second non-inverting input of the combiner 270.

An input of the combiner 205 is available as an input of the encoder 200, for receiving high bit depth pictures. An input of the upsampler 250 is available as an input of the encoder 200, for receiving a base layer motion vector. An input of the upsampler 265 is available as an input of the encoder 200, for receiving a low bit depth base layer residual. An output of the entropy coder 220 is available as an output of the encoder 200, for outputting a bitstream.

Figure 3:
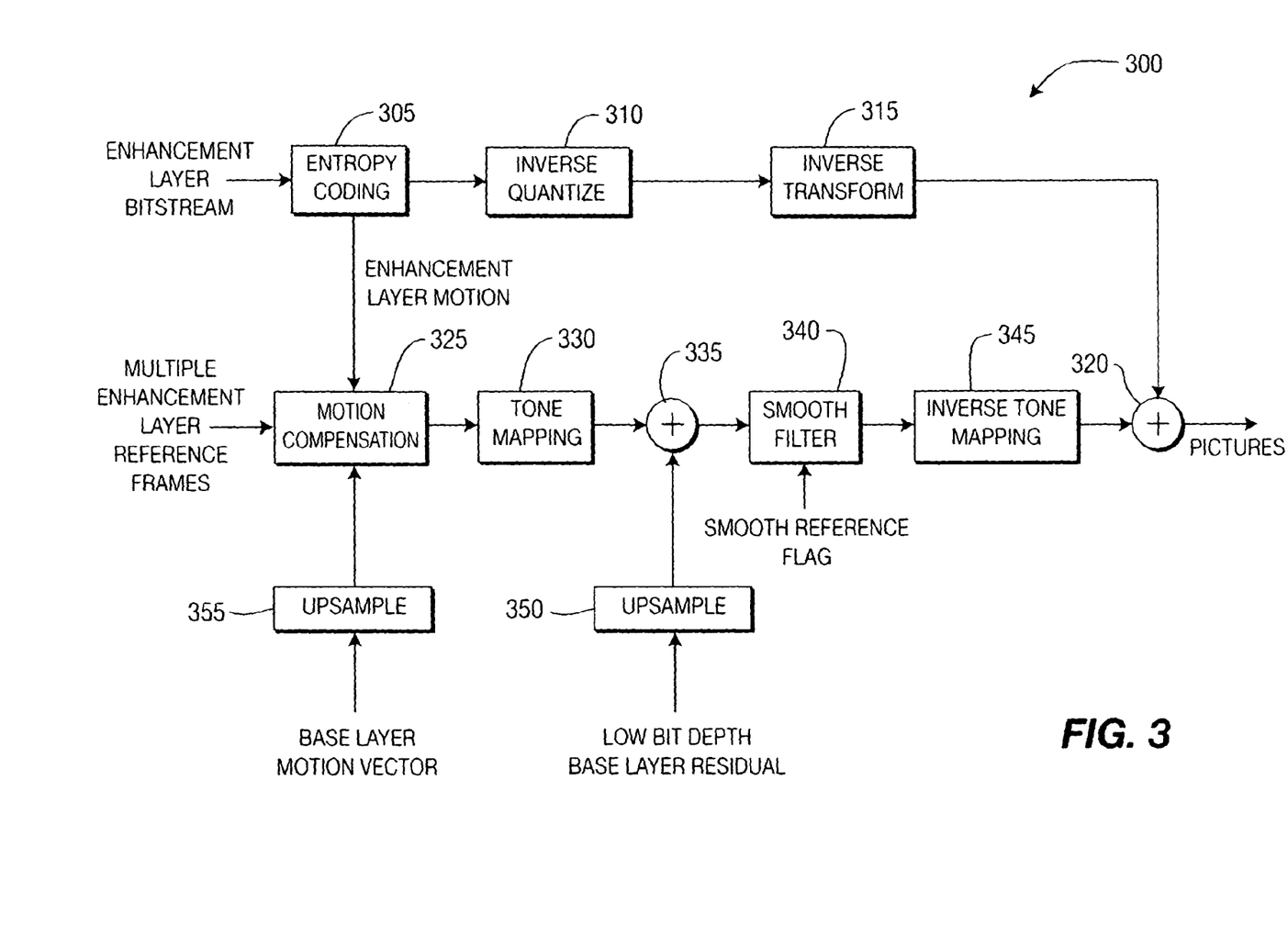
FIG. 3 is a block diagram for an exemplary decoder to which the present principles may be applied, in accordance with an embodiment of the present principles.

Turning to FIG. 3, an exemplary decoder to which the present principles may be applied is indicated generally by the reference numeral 300.

The decoder 300 includes an entropy decoder 305 having a first output in signal communication with an input of an inverse quantizer 310. An output of the inverse quantizer 310 is connected in signal communication with an input of an inverse transformer 315. An output of the inverse transformer 315 is connected in signal communication with a first non-inverting input of a combiner 320.

A second output of the entropy decoder 305 is connected in signal communication with a first input of a motion compensator 325. An output of the motion compensator 325 is connected in signal communication with an input of a tone mapper 330. An output of the tone mapper 330 is connected in signal communication with a first non-inverting input of a combiner 335. An output of the combiner 335 is connected in signal communication with a first input of a smooth filter 340. An output of the smooth filter 340 is connected in signal communication with an input of an inverse tone mapper 345. An output of the inverse tone mapper 345 is connected in signal communication with a second non-inverting input of the combiner 320.

An output of an upsampler 350 is connected in signal communication with a second non-inverting input of the combiner 335. An output of an upsampler 355 is connected in signal communication with a second input of the motion compensator 325.

An input of the entropy decoder 305 is available as an input to the decoder 300, for receiving an enhancement layer bitstream. A third input of the motion compensator 325 is available as an input of the decoder 300, for receiving multiple enhancement layer reference frames. A second input of the smooth reference filter 340 is available as an input to the decoder 300, for receiving a smooth reference flag. An input of the upsampler 350 is available as an input to the decoder 300, for receiving a low bit depth base layer residual. An input of the upsampler 355 is available as an input to the decoder 300, for receiving a base layer motion vector. An output of the combiner 320 is available as an output of the decoder 300, for outputting pictures.

Bit-depth scalability is potentially useful in consideration of the fact that at some point in the future, conventional 8-bit depth and high bit depth digital imaging systems will simultaneously exist in marketplaces.

In accordance with one or more embodiments of the present principles, new techniques are proposed for inter-layer residue prediction for bit depth scalability (BDS).

In bit depth scalability, if single loop decoding is used, when motion compensation is performed at the enhancement layer (higher bit depth layer), it is difficult to apply inverse tone mapping for inter-layer residue prediction. Thus, in accordance with the present principles, we present new inter-layer residue prediction techniques to improve the coding efficiency of bit depth scalability. In accordance with one or more embodiments of the present principles, instead of doing inverse tone mapping for inter-layer residue prediction in the residue domain, we convert the inverse tone mapping problem from the residue domain to the pixel domain (spatial domain) for inter-layer residue prediction.

For illustrative purposes, one or more examples are provided herein which consider only bit-depth and the use of a single loop decoding architecture. However, it is to be appreciated that, given the teachings of the present principles provided herein, such principles as described with respect to the above reference examples may be readily extended by one of ordinary skill in this and related arts to combined scalability including, but not limited to, for example, bit-depth and spatial scalability, and so forth. In addition, the present principles may be readily applied in multiple loop decoding architecture. Of course, the present principles are not limited to the preceding applications and variations and, thus, other applications and variations, as readily determined by one of ordinary skill in this and related arts may also be employed with respect to the present principles while maintaining the spirit of the present principles.

Thus, in an embodiment, if inter-layer residue prediction is used, inverse tone mapping is applied after we add tone mapped motion compensated prediction and upsampled residue from the base layer. For bit depth scalability only, the spatial upsampling factor is 1.

Correspondingly, one example of an encoding method in accordance with an embodiment is as follows:
1. The prediction block P is obtained using the enhancement layer reference frames and then P is tone mapping into base layer, we get T(P);
2. The corresponding base layer residual block $r_b$ is spatially upsampled and $U(r_b)$ is added to P to form $T(P)+U(r_b)$;
3. A filter is used, to obtain $S(T(P)+U(r_b))$;
4. Inverse tone mapping is then applied, to obtain $T^{-1}(S(T(P)+U(r_b)))$; and
5. The enhancement layer residual block $r_e$ is generated by subtract (4) from enhancement layer block O, $r_e=O-T^{-1}(S(T(P)+U(r_b)))$.

Figure 4:
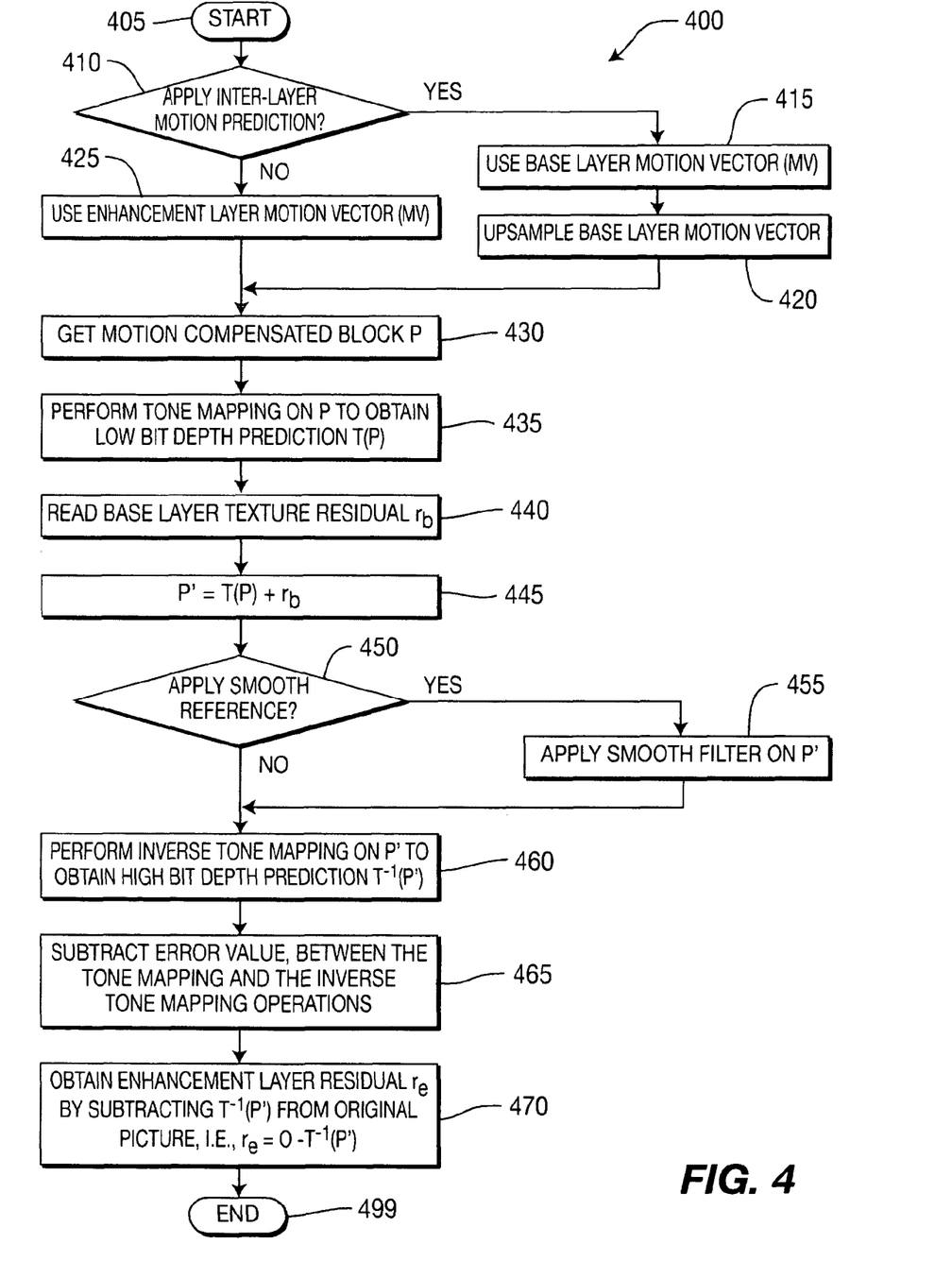
FIG. 4 is a flow diagram for an exemplary method for encoding using inter-layer residual prediction for bit depth scalability, in accordance with an embodiment of the present principles.

Turning to FIG. 4, an exemplary method for encoding using inter-layer residual prediction for bit depth scalability is indicated generally by the reference numeral 400.

The method 400 includes a start block 405 that passes control to a decision block 410. The decision block 410 determines whether or not to apply inter-layer motion prediction. If so, then control is passed to a function block 415. Otherwise, control is passed to a function block 425.

The function block 415 use a base layer motion vector, and passes control to a function block 420. The function block 420 upsamples the base layer motion vector, and passes control to a function block 430.

The function block 425 uses an enhancement layer motion vector, and passes control to the function block 430.

The function block 430 gets the motion compensated block P, and passes control to a function block 435. The function block 435 performs tone mapping on P to obtain a low bit depth T(P), and passes control to a function block 440. The function block 440 reads the base layer texture residual $r_b$, and passes control to a function block 445. The function block 445 calculates $P'=T(P)+r_b$, and passes control to a decision block 450. The decision block 450 determines whether or not to apply a smooth reference. If so, the control is passed to a function block 455. Otherwise, control is passed to a function block 460.

The function block 455 applies the smooth filer on P', and passes control to a function block 460.

The function block 460 performs inverse tone mapping on P' to obtain a high bit depth prediction $T^{-1}(P')$, and passes control to a function block 465. The function block 465 subtracts an error value, between the tone mapping and the inverse tone mapping operations, from the high bit depth prediction $T^{-1}(P')$, and passes control to a function block 470. The function block 470 obtains the enhancement layer residual $r_e$ by subtracting $T^{-1}(P')$ from the original picture, where $r_e=O-T^{-1}(P')$, with O representing the original picture, and passes control to an end block 499.

One example of a decoding method in accordance with an embodiment is as follows:
1. The prediction block P is obtained using the enhancement layer reference frames and then P is tone mapping into base layer, we get T(P);
2. The corresponding base layer residual block $r_b$ is spatially upsampled and $U(r_b)$ is added to P to form $T(P)+U(r_b)$;
3. A filter is used, to obtain $S(T(P)+U(r_b))$;
4. Inverse tone mapping is then applied, to obtain $T^{-1}(S(T(P)+U(r_b)))$; and
5. The enhancement layer residual block is added to (4) to obtain the reconstruction block $R=T^{-1}(S(T(P)+U(r_b)))+r_e$ Turning to FIG. 5, an exemplary method for decoding using inter-layer residual prediction for bit depth scalability is indicated generally by the reference numeral 500.

Figure 5:
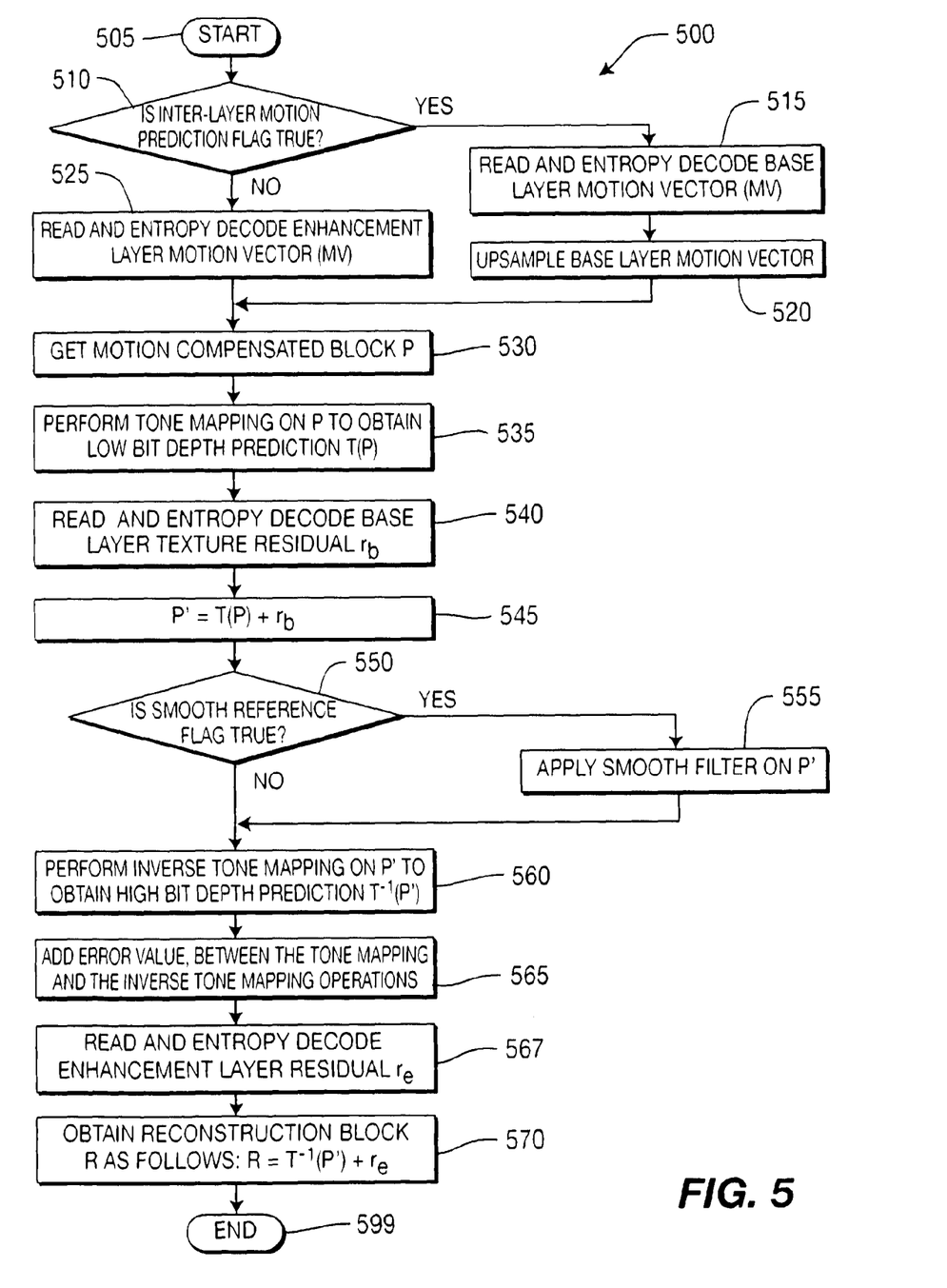
FIG. 5 is a flow diagram for an exemplary method for decoding using inter-layer residual prediction for bit depth scalability, in accordance with an embodiment of the present principles.

The method 500 includes a start block 505 that passes control to a decision block 510. The decision block 510 determines whether or not an inter-layer motion prediction flag is set to true. If so, then control is passed to a function block 515. Otherwise, control is passed to a function block 525.

The function block 515 reads and entropy decodes a base layer motion vector, and passes control to a function block 520. The function block 520 upsamples the base layer motion vector, and passes control to a function block 530.

The function block 525 reads and entropy decodes an enhancement layer motion vector, and passes control to the function block 530.

The function block 530 gets the motion compensated block P, and passes control to a function block 535. The function block 535 performs tone mapping on P to obtain a low bit depth T(P), and passes control to a function block 540. The function block 540 reads and entropy decodes the base layer texture residual $r_b$, and passes control to a function block 545. The function block 545 calculates $P'=T(P)+r_b$, and passes control to a decision block 550. The decision block 550 determines whether or not a smooth reference flag is set to true. If so, the control is passed to a function block 555. Otherwise, control is passed to a function block 560.

The function block 555 applies the smooth filer on P', and passes control to a function block 560.

The function block 560 performs inverse tone mapping on P' to obtain a high bit depth prediction $T^{-1}(P')$, and passes control to a function block 565. The function block 565 adds an error value, between the tone mapping and the inverse tone mapping, to the high bit depth prediction $T^{-1}(P')$, and passes control to a function block 567. The function block 567 reads and entropy decodes the enhancement layer residual $r_e$, and passes control to a function block 570. The function block 570 obtains the reconstruction block R, where $R=T^{-1}(P')+r_e$, and passes control to an end block 599.

It has been noted in the prior art that the motion compensated block P can be generated by a motion vector from the enhancement layer if inter-layer motion prediction is not used, or from an upsampled motion vector from the base layer if inter-layer motion prediction is used. In an embodiment of the present principles, we allow our techniques to be used for both cases. In another embodiment, our techniques can only be combined when inter-layer motion prediction is used. If inter-layer motion prediction is not used, bit shift is applied for residue prediction, as in the above references third and fourth prior art approaches.

Also, the schemes of the third and fourth prior art approaches can be switched. That is, we can first perform filtering then inverse tone mapping. Alternatively, we can first perform inverse tone mapping, then perform filtering. The filter can be linear, or nonlinear, one dimensional, or two dimensional, and so forth. In one example, we can use 3 tap filter [1 2 1], first vertically, then horizontally. The filter can also be identical, such that the third prior art procedure is not required.

Thus, in accordance with one embodiment of the present principles, we signal both tone mapping and inverse tone mapping method. The signaling may be performed using an algorithm calculation, a look up table, and/or so forth. The signaling may be performed at the sequence, picture, slice, or block level. Since tone mapping and inverse tone mapping are not truly invertible, i.e., $T^{-1}(T) \neq I$, we can take the error $I-T^{-1}(T)$ into consideration, where I means identity. In one example, since $T^{-1}(T(P)) \neq P$, we can take the error $d=P-T^{-1}(T(P))$ into consideration. That is, at the encoder, we subtract d. At the decoder, we add d.

A description will now be given of some of the many attendant advantages/features of the present invention, some of which have been mentioned above. For example, one advantage/feature is an apparatus having an encoder for encoding a block of a picture by applying inverse tone mapping to an inter-layer residue prediction process for the block. The inverse tone mapping is performed in the pixel domain to support bit depth scalability.

Another advantage/feature is the apparatus having the encoder as described above, wherein the encoder performs the inter-layer residue prediction process by performing motion compensation in an enhancement layer of the picture to obtain an enhancement layer prediction, performing tone mapping on the enhancement layer prediction into a base layer of the picture to obtain a tone mapped motion compensated low bit depth prediction for the block, adding a spatially upsampled residue from the base layer to the tone mapped motion compensated low bit depth prediction for the block to obtain a sum, and performing the inverse tone mapping on the sum into the enhancement layer to obtain a higher bit depth prediction for the block.

Yet another advantage/feature is the apparatus having the encoder as described above, wherein the encoder further performs the inter-layer residue prediction process by applying a smoothing filter to the sum prior to performing the inverse tone mapping. The inverse tone mapping is performed on the filtered sum.

Still another advantage/feature is the apparatus having the encoder as described above, wherein at least one of a high level syntax element and a block level syntax element is used to signal any of the tone mapping and the inverse tone mapping.

Moreover, another advantage/feature is the apparatus having the encoder as described above, wherein the high level syntax element is comprised in at least one of a slice header, a sequence parameter set, a picture parameter set, a view parameter set, a network abstraction layer unit header, and a supplemental enhancement information message.

Further, another advantage/feature is the apparatus having the encoder as described above, wherein the encoder further performs the inter-layer residue prediction process by subtracting an error value, between the tone mapping and the inverse tone mapping, from the higher bit depth prediction for the block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a decoder for decoding a block of a picture by applying inverse tone mapping in the pixel domain, wherein said decoder includes:
a motion compensator;
a tone mapper directly coupled to said motion compensator;
a combiner directly coupled to said tone mapper;
a spatial upsampler directly coupled to said combiner;
an inverse tone mapper coupled to said combiner; and
wherein said motion compensator performs motion compensation in an enhancement layer of the picture to obtain an enhancement layer prediction, said tone mapper performs tone mapping on the enhancement layer prediction of the picture to obtain a tone mapped motion compensated low bit depth prediction for the block, said combiner adds a spatially upsampled residue from the base layer to the tone mapped motion compensated low bit depth prediction for the block to obtain a sum, and said inverse tone mapper performs the inverse tone mapping on the sum to obtain a higher bit depth prediction for the block.

2. The apparatus of claim 1, wherein said decoder further applies a smoothing filter to the sum prior to performing the inverse tone mapping, and wherein the inverse tone mapping is performed on the filtered sum.

3. The apparatus of claim 1, wherein at least one of a high level syntax element and a block level syntax element is used to signal any of the tone mapping and the inverse tone mapping.

4. The apparatus of claim 3, wherein the high level syntax element is comprised in at least one of a slice header, a sequence parameter set, a picture parameter set, a view parameter set, a network abstraction layer unit header, and a supplemental enhancement information message.

5. The apparatus of claim 1, wherein said decoder further adds an error value, wherein said error value is between signal values obtained from the tone mapping and the inverse tone mapping, to the higher bit depth prediction for the block.

6. The apparatus of claim 1, wherein the inverse tone mapping is performed in the pixel domain to support bit depth scalability.

7. A method, comprising:
decoding a block of a picture by applying inverse tone mapping in a pixel domain, wherein the decoding step includes:
performing motion compensation in an enhancement layer of the picture to obtain an enhancement layer prediction;
performing tone mapping on the enhancement layer prediction of the picture to obtain a tone mapped motion compensated low bit depth prediction for the block;
adding a spatially upsampled residue from the base layer to the tone mapped motion compensated low bit depth prediction for the block to obtain a sum; and
performing the inverse tone mapping on the sum to obtain a higher bit depth prediction for the block.

8. The method of claim 7, wherein the decoding step further comprises applying a smoothing filter to the sum prior to said step of performing the inverse tone mapping, and wherein the inverse tone mapping is performed on the filtered sum.

9. The method of claim 7, wherein at least one of a high level syntax element and a block level syntax element is used to signal any of the tone mapping and the inverse tone mapping.

10. The method of claim 9, wherein the high level syntax element is comprised in at least one of a slice header, a sequence parameter set, a picture parameter set, a view parameter set, a network abstraction layer unit header, and a supplemental enhancement information message.

11. The method of claim 7, wherein an error value, wherein said error value is between signal values obtained from the tone mapping and the inverse tone mapping, is further added to the higher bit depth prediction for the block.

12. The method of claim 7, wherein the inverse tone mapping is performed in the pixel domain to support bit depth scalability.

* * * * *